United States Patent [19]

Utt et al.

[11] 3,848,125

[45] Nov. 12, 1974

[54] COATING THICKNESS GAUGE

[75] Inventors: Orval L. Utt; Howard J. Evans, both of Columbus, Ohio

[73] Assignee: Industrial Nucleonics Corporation, Columbus, Ohio

[22] Filed: Sept. 20, 1971

[21] Appl. No.: 181,836

[52] U.S. Cl. ............................. 250/272, 250/273
[51] Int. Cl. ........................................ G01n 23/22
[58] Field of Search ................... 250/51.5, 83.3 D

[56] References Cited
UNITED STATES PATENTS
3,409,774  11/1968  Dykeman .................... 250/83.3 D
3,562,525  2/1971  Constantine ..................... 250/51.5

OTHER PUBLICATIONS

"Fast Response Densetometer; Instruction and Maintenance Manual," Nasa Contract Report No. NAS 8-19127, 1967.

Primary Examiner—Archie R. Borchelt
Assistant Examiner—C. E. Church
Attorney, Agent, or Firm—Allan M. Lowe; C. Henry Peterson

[57] ABSTRACT

Disclosed is a system for measuring the thickness of a zinc coating on an iron sheet wherein the coating and substrate are irradiated by a continuous X-ray beam source. The beam is propagated in a first or positive direction away from the source through a reference chamber to the coating and substrate. In response to fluorescence of the coating and substrate due to X-ray irradiation, secondary X-rays are derived and propagate in a second or negative direction generally towards the source. The intensity of the negatively directed X-rays is determined with a measuring chamber concentric with the reference chamber. The reference and measuring chambers include a noble gas that is ionized in response to the X-rays impinging thereon. Gases flow between the two chambers by a structure which prevents coupling of ions between the chambers, whereby the relative sensitivity of the two chambers is equalized. Responses from the two chambers are combined to provide a signal that is independent of intensity variations of the X-ray beam source. The combined signal is electronically processed to provide an output signal directly proportional to the zinc coating. Standardization of the gauge is performed by substituting first and second samples, respectively having no and a predetermined amount of zinc on an iron substrate, for the sheet being measured for coating thickness.

17 Claims, 2 Drawing Figures

COATING THICKNESS GAUGE

FIELD OF INVENTION

The present invention relates generally to gauges for measuring the thickness of a coating on a metal substrate and more particularly to a gauge wherein a detector responsive to energy resulting from fluorescence derived from the irradiated material derives an output signal that is an exponential function of coating thicknesses.

BACKGROUND OF THE INVENTION

It is known that a metal coating on a metal substrate, for example, a zinc coating on an iron or steel substrate, fluoresces to derive radiation at different energy levels in response to irradiation by a gamma ray or X-ray source. The radiation derived from the coating and substrate is at disparate energy levels which can be separately detected. For example, secondary radiation from a zinc coating has an energy level and spectral properties commensurate with 8.6 KeV, while secondary radiation from an iron substrate fluoresces to produce at an energy level of 6.4 KeV. The iron substrate also derives higher energy, Compton radiation in response to irradiation by an X-ray or gamma ray source.

A technique widely adopted in prior art devices for determining the thickness of a metal coating on a metal substrate in response to secondary energy at different levels is the so called Ross filter technique. Apparatus utilizing the Ross filter technique includes two different detectors, each with a separate filter for passing different bands of energy levels, whereby one detector derives an output signal commensurate with the total amount of X-ray radiation derived from the coating and substrate and a second detector derives an output signal commensurate with the total X-ray radiation derived from the substrate, minus the X-ray radiation fluoresced from the coating. The output signals of the two filters are linearly combined in a subtractive manner to derive an indication of coating thickness.

A problem inherent in the use of the Ross filter technique involves subtracting two signals which may have amplitudes very close to each other. Such a subtraction operation can result in errors because the difference signal may be an order of magnitude, or more, less than the signals which were combined. When it is considered that an X-ray or gamma ray source inherently includes statistical variations, which add to the noise level of the detected signal, it is seen that there is a relatively high probability of error in systems relying upon the Ross filter technique.

BRIEF DESCRIPTION OF THE INVENTION

The gauge of the present invention responds to secondary energy resulting from an X-ray or gamma ray beam fluorescing a material. To determine the thickness of a metal coating on a metal substrate a detector responds to the secondary energy to derive an output signal which is related to coating thickness in accordance with: $I_m = I_0 [1 = K (1 - e - a\mu\rho w$ (1)
where:
$I_m$ equals the current derived from the detector,
$I_0$ is the current derived by the detector for a coating weight of zero,
$K$ equals a proportionality constant,
$e$ equals the base of natural logarithms,
$a$ equals a proportionality constant,
$\mu$ equals a factor dependent upon the attenuation characteristics of the coating for the beam impinging on it,
$\rho$ equals the density of the coating, and
$w$ equals the coating thickness, expressed as ounces per square foot.

The output signal of Equation (1) is derived by utilizing a detector employing a gas that is ionized in response to secondary X-rays from the substrate and coating. A suitable window, preferably fabricated of a thin aluminum sheet, is placed between the ionizable gas and the substrate and coating to attenuate the secondary energy from the substrate to a greater degree than the secondary energy from the coating.

It has been found that the exponential relationship of Equation (1) is generally accurate only over a limited range of coating thicknesses. For a zinc coating on an iron substrate, it has been found that the exponential relationship exists for coating thicknesses in the range of from zero to approximately 1.6 ounces per square foot. For coating thicknesses greater than approximately 1.6 ounces per square foot, the effects of back-scattered Compton radiation apparently influence the amount of ionization and cause a deviation in the exponential relationship. It has been found through experimentation that the output signal decreases in magnitude for coating thicknesses greater than the range over which the exponential relationship holds.

To facilitate relating the detector output signal, as expressed by Equation (1), into a relationship which enables a gauge utilizing an X-ray or gamma ray source to be standardized so that very long term variations of the source intensity can be compensated, the expression of Equation (1) is converted into an exponentially decreasing relationship given by:

$$E_s = E_0 e^{-a} \mu \rho w$$

(2)

where:
$E_s$ equals the output voltage of circuitry for performing the conversion,
$E_0$ is the value of $E_s$ for a coating weight of zero, and the remaining terms are given supra.

The conversion of Equation (1) into Equation (2) is performed by eliminating the terms other than the exponential terms from Equation (1) with an appropriate offset, by reversing the slope direction of the exponential portion of Equation (1), and by adjusting the slope of the exponential portion of Equation (1). Adjusting the slope is performed, essentially, by multiplying the exponential term of Equation (1) by an appropriate, predetermined factor to provide the term $E_0$ in Equation (2).

Selection of the appropriate offset and multiplication factors is performed periodically, on the order of once every half hour, during standardization of the gauge. The offset factor is selected by inserting a first standard sample having a predetermined coating thickness on a substrate for the coating and substrate being monitored. The coating thickness has a value within the range over which the exponential relationship of Equation (1) holds. Preferably, the coating thickness of the first sample is sufficiently removed from a zero coating thickness to enable the most accurate adjustment of the gauge offset factor. For a gauge monitoring the thickness of a zinc coating on an iron or steel substrate, it has been found that a zinc coating in the range of between 1.3 to 1.5 ounces per square foot on an iron substrate provides admirable results. With the first sample being irradiated by the X-ray source, the offset factor is adjusted until a zero output indication is derived. The slope of the exponential relation of Equation (2) is controlled by substituting a second standard sample, consisting of the substrate and having no coating thereon, for the substrate and coating being measured. With the second standard sample being irradiated by the beam, a gain or multiplication factor of the gauge is adjusted until a predetermined output indication is derived. These two operations thereby provide standardization for the gauge and convert the exponential increasing relationship of Equation (1) into the exponentially decreasing relationship given by Equation (2). The exponential decreasing relationship given by Equation (2) is easily converted into a linear relationship by a logarithmic conversion device wherein a zero coating thickness is related to a zero output indication.

It is, accordingly, an object of the present invention to provide a new and improved system for and method of monitoring the thickness of a coating on a metal substrate.

Another object of the invention is to provide a new and improved system for and method of determining the thickness of a metal coating on a metal substrate wherein a detector responds to secondary x-rays derived from the coating and substrate to derive an exponentially increasing output signal over a range of coating thicknesses.

Another object of the invention is to provide a new and improved system for and method of standardizing a gauge for monitoring the thickness of a metal coating on a metal substrate wherein a detector responds to secondary energy from the coating and substrate to derive an exponentially increasing signal relative to coating thickness.

A further object of the invention is to provide a gauge for measuring the thickness of a metal coating on a metal substrate wherein a detector responding to secondary X-rays from the substrate and coating derives an exponentially increasing signal relative to coating thickness and wherein the exponentially increasing relationship is converted into an exponentially decreasing relationship having the correct slope vs. weight relationship by the same means as is employed for standardizing the guage to compensate for variables such as fluctuations in output of an energy source that causes the coating and substrate to flouresce and thereby to produce the secondary energy.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
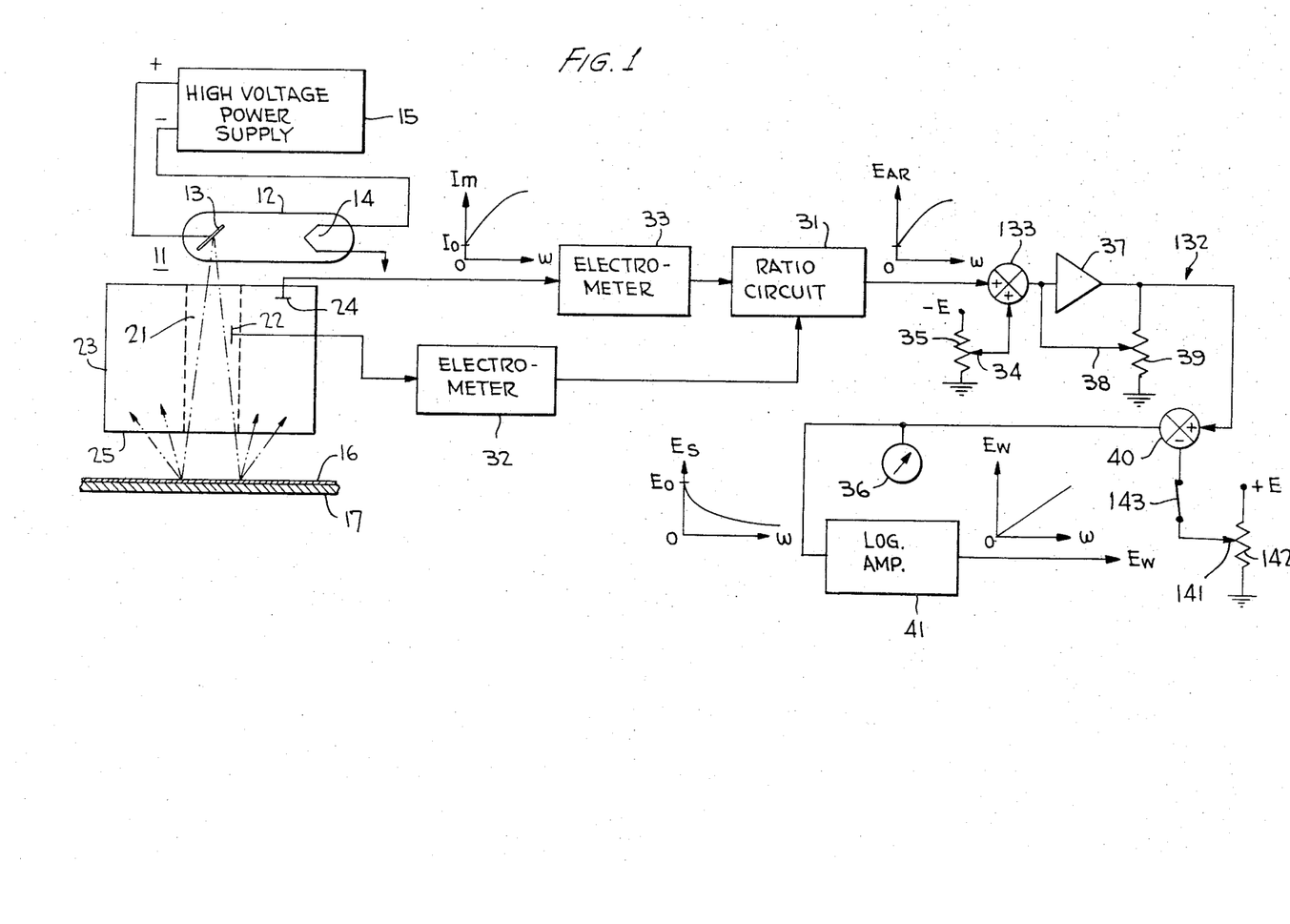
FIG. 1 is a schematic view of the improved X-ray gauge of the present invention in combination with apparatus for processing the signal derived from the gauge to indicate the thickness of a zinc coating on an iron substrate.

Reference is now made to FIG. 1 of the drawing wherein there is illustrated a continuous beam X-ray point source 11 comprising X-ray tube 12 which includes anode 13 and filament 14. The beam continuously derived from source 11 is regulated with regard to spectral properties by connecting a regulated high voltage power supply 15 between anode 13 and cathode 14. The beam intensity is regulated, as effectively as possible, by providing the power supply 15 with current regulation. By regulating the anode current of source 11, and therefore the intensity of the X-ray beam emitted thereby, the fluctuation noise in the beam is maintained at a relatively constant level despite aging of the tube 12.

The beam constantly derived from source 11 propagates in a first or positive direction to irradiate the material being monitored, zinc coating 16 on steel or iron substrate 17. In response to the energy in the beam, zinc coating 16 and substrate or sheet 17 fluoresce at different energy levels to produce secondary X-rays having a component that propagates in a second or negative direction opposite from the first direction. the zinc coating fluoresces at an energy level of 8.6 KeV, while the iron substrate 17 fluoresces at an energy level of 6.4 KeV. In addition, Compton radiation is derived from iron substrate 17 at an energy level lower than the beam energy level.

The X-ray beam is transmitted through a reference chamber 21 prior to irradiating coating 16 and substrate 17. Reference chamber 21 includes an ionizable gas, preferably a noble, i.e., inert, gas, such as argon, which is ionized in response to energy absorbed thereby from the X-ray beam in the presence of a collecting potential. The gas absorbs approximately only one percent of the energy of the beam derived from source 11 so that the beam passes through chamber 21 with a very small degree of attenuation. To monitor the intensity of the beam derived from source 11, chamber 21 is provided with an electrode 22 on which is derived signal current having a magnitude indicative of the intensity of the beam derived from source 11.

At the outlet of chamber 21 a rectangular aperture is provided, whereby the beam is shaped into a rectangular cross section to enable greater definition of the thickness of coating 16 to be ascertained at the edges of the substrate 17 where spooling (thick coating at the edges of the sheet) is likely to occur. It is thus seen that the beam which irradiates coating 16 and substrate 17 is intercepted by reference chamber 21. Thereby, an accurate indication of the intensity of the beam impinging on coating 16 and iron sheet 17 is derived at electrode 22.

Concentric with reference chamber 21, between source 11 and substrate 17, is measuring chamber 23, positioned to be responsive to negatively directed X-ray radiation from coating 16 and iron sheet 17. Measuring chamber 23 also includes an ionizable gas which is ionized in response to the X-ray radiation reaching it. Electrode 24 in chamber 23 derives a signal current having a magnitude proportional to the amount of ionization of the gas in chamber 23.

Preferably, the gases in chambers 21 and 23 have the same relative sensitivity to the X-ray radiation detected thereby, although in certain instances this is not essential. The relative ion sensitivity of the gases in chambers 21 and 23 is maintained the same by applying the same collecting potentials to the chambers and equalizing the pressure and purity of the gases in the two chambers. This result is achieved by allowing gases from chambers 21 and 23 to communicate with each other without permitting migration of ions between the chambers. This is achieved in chamber 21 by overcoming the diffusion forces of the ions with a strong electric field and in chamber 23 by providing relatively long holes (holes considerably greater than the mean free path of an ion) in a wall between chambers 21 and 23.

Chamber 23 is provided with an annular, aluminum window 25 which absorbs a very significant percentage (on the order of 89 percent) of the negatively directed energy from iron sheet 17, while absorbing a considerably lower percentage (on the order of 60 percent) of the more intense negatively directed energy from zinc coating 16. The Compton radiation negatively directed from iron sheet 17 has such a high energy level that it is effectively unabsorbed by window 25 and the noble gas in chamber 23. Thereby, the current derived at electrode 24 can be mathematically related, over a predetermined range, to the thickness of zinc coating 16. Ionization of the gas in chamber 23 due to the zinc coating is an exponentially increasing function of coating thickness, which function has a zero value for a zero thickness of coating 16. The ionization in chamber 23 in response to 6.4 KeV radiation from sheet 17 is an exponentially decreasing function, having a finite, non-zero value for zinc coating of zero. Compton radiation effecting ionization of the gas in chamber 23 decreases from a finite value for a zinc coating of zero to a low level for a very thick coating of zinc. The Compton radiation decrease is at a much slower rate than the two exponential rates for relatively thick coatings.

The ionization level of the gas in chamber 23, due to these three ionization effects, accurately represents over a limited range, the thickness of zinc coating 16 in accordance with Equation (1).

Equation (1) is valid only over a limited region of between 0 and approximately 1.6 ounces per square foot of zinc coating 16. For coating thicknesses greater than approximately 1.6 ounces per square foot, the Compton radiation apparently has a greater percentage change on the exponential relationship of Equation (1) and the equation is no longer an accurate representation of coating thickness. Over most practical thicknesses of coating 16 the current derived at electrode 24 is, therefore, the predetermined mathematical relationship of Equation (1).

In Equation 1, the term $I_o$ is subject to variation due to drifting of X-ray source 11. Drifting of source 11 occurs even though power supply 15 is current regulated. To prevent drifting of source 11 from affecting the accuracy of the measurement signal derived by electrode 24, the current levels derived by electrodes 22 and 24 are combined in ratio circuit 31, after having been converted into voltage levels by electrometers 32 and 33, respectively. Electrometer circuits 32 and 33 include the usual high impedance input resistor and a low pass filter circuit to substantially eliminate variations of the amplitudes of the currents derived by electrodes 22 and 24 in response to statistical variations of the X-ray beam derived from source 11. The output signal of ratio circuit 31 has the same form as Equation (1), except that the value of $I_o$ is stabilized due to the output of electrometer circuit 33 being divided by the output of electrometer circuit 32.

The exponentially increasing relationship of Equation (1), relating the output signal of divider or ratio circuit 31 to the thickness of coating 16, is converted into an exponentially decreasing function of output signal versus coating thickness by circuit 132. In particular, circuit 132 converts the response indicated by Equation (1) into a response given by Equation (2).

To convert the response of Equation (1) into Equation (2), circuit 132 includes summing cirucit 133 responsive to the positive output signal of ratio circuit 31 and a constant negative signal derived from slider 34 of potentiometer 35. Slider 34 is set at a point whereby the response of ratio circuit 31 is reduced so that there is a zero output signal of summer 133 for a predetermined finite thickness of zinc coating 16. The position of potentiometer 34 is adjusted during standardization, as occurs on the order of once every half hour, when the measuring operation is terminated and a first standard sample, in the form of an iron sheet having the predetermined zinc coating thickness deposited thereon is substituted for the sheet being measured. The setting of potentiometer 34 is adjusted during the standardization procedure with the first sample in the X-ray source 11 beam field of view until a zero reading is derived from circuit 132, as indicated by meter 36 at the output terminal of the circuit. Adjustment of potentiometer 34 can be manual or automatic in response to the voltage level at the output of ciruit 132.

The coating thickness of the first standard sample is within the range over which the exponential relationship of Equation (1) is an accurate representation of coating thickness. The first standard sample coating thickness should also be sufficiently displaced from zero to enable accurate two-point standardization to be attained. It has been found that a thickness of between 1.3 and 1.5 ounces per square foot provides admirable results.

The output of summing circuit 133 is fed to a variable gain, polarity reversing amplifier 37 which reverses the slope direction of the exponential term in Equation (1) and controls the slope magnitude, $E_o$, of the exponential term. The slope magnitude is determined by the gain of amplifier 37, which is controlled by the setting of slider 38 of potentiometer 39. The setting of slider 38 adjusts the gain of amplifier 37 so that the sensitivity of the measuring circuit corresponds with the desired gauge sensitivity and the slope of the exponential curve is appropriately adjusted. The setting of slider 38 is performed during standardization, after the setting of slider 34 has been adjusted, by placing a second standard sample, consisting of an iron substrate, i.e., a zero coating of zinc on an iron substrate, in the field of view of the X-ray beam derived by source 11. With the second standard sample in situ, the setting of slider 38 is adjusted until a predetermined output voltage is read from meter 36. This operation can be performed either automatically or manually. By adjusting the setting of slider 34 prior to adjustment of the setting of slider 38, the gauge is standardized in a noniterative manner, whereby the gauge is accurately standardized by performing the two named steps, without repeating any of the steps, and the output signal magnitude of circuit 132 is related to coating thickness in accordance with Equation (2), except for an offset factor.

The offset factor is completely independent of any gauge parameters subject to drift or change and therefore can be eliminated by an a priori determined constant voltage. To this end, the output of circuit 132 is linearly combined in a subtractive manner in summing network 40 with a constant offset voltage derived from fixed slider 141 of potentiometer 142. The voltage derived from slider 141 is fed to network 40 through normally closed switch 143. Switch 143 is open circuited during standardization with the first sample so that the voltage at slider 141 does not affect the reading of meter 36.

The output signal of circuit 40 is fed to logarithmic amplifier 41 which converts the exponential relationship of Equation (2) to a linear, straight-line relationship between output voltage and coating thickness, wherein an output voltage of zero is commensurate with a zinc coating thickness of zero ounces per square foot. The output signal of logarithmic amplifier 41 is fed to appropriate meters, visual displays or chart recorders (not shown).

A detailed mathematical analysis of the system of FIG. 1 is as follows:

$$I_m = I_o + K_1 I_o (1 - e^{-a \mu \rho w}) \tag{3}$$

$$I_r = K_2 I_o \tag{4}$$

where:
  $K_1$ and $K_2$ are proportionality constants, and
  $I_r$ = output current of reference chambers 21.
  $I_m$ = output current of measuring chamber 23.

By considering the impedances of electrometer circuits 32 and 33 the output voltage of ratio circuit 31 is:

$$I_m/I_r = [1 + K_1 (1 - e^{-a \mu \rho w})] K_3 \tag{5}$$

where:
  $K_3$ = a proportionality constant dependent upon the impedances of circuits 32 and 33 and the sensitivity of chambers 21 and 23.

The output of combining network 133 is:

$$e_{133} = K_3[1 + K_1(1 - e^{-a \mu \rho w})] - E_{off_1} \tag{6}$$

where:
  $e_{133}$ = the output voltage of network 133
  $E_{off}$ = an offset voltage established during standardization at slider 34.

The output of combining network 133 is modified by the gain, $G$, of amplifier 37 so that the amplifier output voltage, $e_{37}$, is:

$$e_{37} = GK_3[1 + K_1(1 - e^{-a \mu \rho w})] - GE_{off_1} \tag{7}$$

The output voltage, $e_{40}$, of combining network 40 during normal operation and standardization with a zero coating sample is:

$$e_{40} = GK_3[1 + K_1(1 - e^{-a \mu \rho w})] - GE_{off_1} + E_{off_2} \tag{8}$$

where:

$E_{off_2}$ = constant a priori voltage derived from slider 141 of potentiometer 142.

During standardization with a standard sample having a coating thickness of $w_1$ substitued for the sheet being measured and slider 141 disconnected from network 40 ($E_{off_2} = 0$), and the position of slider 34 adjusted so the output of network 40 equals zero $$e_{40} = 0 = GK_3[1 + K_1 (1 - e^{-a \mu \rho w_1})] - E_{off_1} G \tag{9}$$

so that $$E_{off_1} = K_3[1 + K_1(1 - e^{-a \mu \rho w_1})] \tag{10}$$

Substituting Equation (10) into Equation (8) gives $$e_{40} = GK_3[1 + K_1(1 - e^{-a \mu \rho w})] - GK_3[1 + K_1(1 - e^{-a \mu \rho w_1})] + E_{off_2} = GK_1K_3 \{e^{-a \mu \rho w_1} - e^{-a \mu \rho w}\} + E_{off_2} \tag{11}$$

During the second standardization operation, when a standard sample having a zero coating thickness is substituted for the sheet being measured and slider 141 is connected into the circuit, the gain of amplifier 37 is adjusted until a predetermined output voltage, $E_R$, is derived from it, whereby:

$$e_{40} = E_R = GK_1K_3 \{e^{-a \mu \rho w_1} - e^{-0}\} + E_{off_2} \tag{12}$$

$E_{off}$ can be preset so that $$E_{off_2} = E_R e^{-a \mu \rho w_1} \tag{12a}$$

because each of the terms on the right side of Equation (12a) is a constant independent of drift or other variations. By substituting Equation (12a) into Equation (12), $$e_{40} = E_R = GK_1K_3 \ e^{-a \mu \rho w_1} - e^{-0} + E_R e^{-a \mu \rho w_1}$$

$$G = E_R - E_R e^{116 a \mu \rho w_1}/K_1K_3 [e^{-a \mu \rho w_1} - 1]$$

$$= - E_R/K_1K_3 \tag{13}$$

by substituting Equations (12a) and (13) into Equation (11)

$$e_{40} = - E_R \{e^{-a \mu \rho w_1} - e^{-a \mu \rho w}\} + E_R e^{-a \mu \rho w_1},$$

so that $$e_{40} = E_R e^{-a \mu \rho w} \tag{14}$$

The output signal expressed by Equation (14) is independent of any variations in the intensity of the beam derived by X-ray source 11, whether these variations are due to current variations of the source power supply, dirt in the beam path, or gain changes in the electrometer impedances. If there are any drift or gain changes in the processing electronics, they are compensated by the periodic standardization operations.

Figure 2:
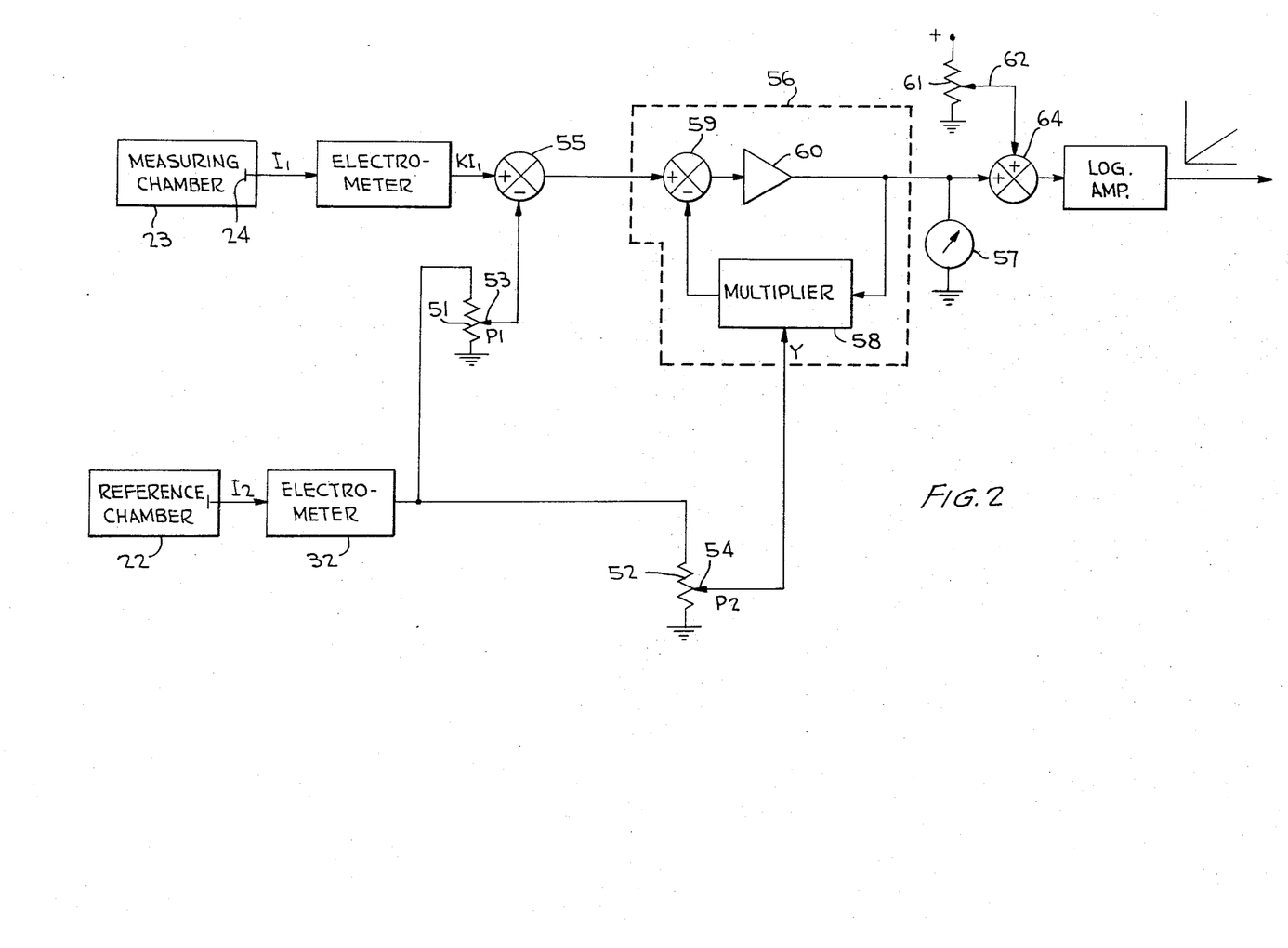
FIG. 2 is a circuit diagram of another embodiment of a portion of the processing circuitry which can be utilized in lieu of the processing circuitry illustrated in FIG. 1.

Reference is now made to FIG. 2 of the drawing wherein there is illustrated a block diagram of a modified system for converting the increasing exponential relationship of Equation (1) into the decreasing exponential relationship indicated by Equation (2). As in the circuit of FIG. 1, the output signals of reference and measuring chambers 21 and 23 respectively derived from electrodes 22 and 24, are applied to electrometer circuit 32 and 33. The output signal of electrometer circuit 32, a voltage level proportional to the intensity of the X-ray beam impinging on coating 16 and substrate 17, is applied in parallel to multiplying potentiometers 51 and 52. Sliders 53 and 54 of potentiometers 51 and 52, respectively, are set to provide offset and slope adjustment to convert the relationship of Equation (1) into Equation (2).

The setting of potentiometer 53 is established during standardization with a first standard sample which can be identical to the first standard having the predetermined, finite zinc coating on the iron or sample employed in conjunction with the embodiment of FIG. 1. With the first standard sample in the X-ray source field of view, the position of slider 53 is adjusted until the output signal of linear combining network 55, responsive at this time to the voltages derived from electrometer circuit 33 and slider 43, is zero, as monitored by voltmeter 57, at the output terminal of divider 56. The position of slider 54 is adjusted during standardization with a second standard sample, having a zero zinc coating on an iron or steel substrate, substituted for the metal sheet being monitored. The position of slider 54 is adjusted until a predetermined, finite voltage level is derived from divider 56, as monitored by meter 57.

With slider 53 appropriately adjusted, the output signal of combining network 55 includes the exponential term in Equation (1) and a constant, offset factor. The slope direction and magnitude of the exponential term of Equation (1) are reversed and controlled by divider 56 so that the divider derives an exponentially decreasing output signal accurately relating voltage to coating thickness, with slider 54 appropriately set. To these ends, divider 56 includes inputs responsive to the output of difference network 55 and the voltage at slider 54, as well as a polarity reversing amplifier. One particular divider including a polarity reversing amplifier comprises a feedback multiplier 58, responsive to the signal derived from slider 54 and the divider output signal. The output of multiplier 58 is fed to linear combining network 59 where it is combined with the output signal of difference network 55 to derive a signal proportional to the output of network 55 minus the output of divider 56 multiplied by the signal derived from slider 54. The resulting difference signal derived from circuit 59 is fed to polarity reversing, high gain, operational amplifier 60. The output signal of amplifier 60 is fed to voltmeter 57 which is employed during standardization for adjustment of potentiometers 51 and 52.

To eliminate the constant, offset factor in the output signal of divider 56, which is independent of any gauge parameters subject to change, and therefore can be determined on an a priori basis, the output signal of divider 56 is linearly combined in a subtractive manner with a voltage derived from slider 62 of potentiometer 61. The voltage derived from slider 62 is equal to the offset factor and is fed to subtraction network 64, having another input responsive to the output of divider 56. The resulting difference voltage generated by network 64 is fed to logarithmic to linear converter 41 which derives an output signal linearly related to coating thickness, such that a zero voltage is correlated with zero coating thickness.

A detailed mathematical analysis of the system of FIG. 2 is as follows:

$$I_m = I_o + K_1 I_o (1 - e^{-a \mu \rho w}) \quad (15)$$

$$I_r = K_2 I_o \quad (16)$$

The output currents given by Equations (15) and (16) are transposed into output voltages of electrometer circuits 32 and 33 as:

$$E_m = I_m Z_{33} \quad (17)$$

$$E_R = I_r Z_{32} \quad (18)$$

where:
$E_m$ = output voltage of electrometer circuit 33.
$E_R$ = output voltage of electrometer circuit 32.
$Z_{32}$ = impedance of electrometer circuit 32.
$Z_{33}$ = impedance of electrometer circuit 33.

By substitution:

$$E_m = I_m Z_{33} = I_o Z_{33} + K_1 I_o Z_{33}(1 - e^{-a \mu \rho w}) \quad (19)$$

cl $E_R = I_r Z_{32} = K_2 I_o Z_{32} \quad (20)$

The output voltage of linear combining network 55 is:

$$e_{55} = E_m - P_1 E_R \quad (21)$$

where:
$e_{55}$ = output voltage of network 55, and
$P_1$ = setting of slider 53, as determined during standardization.

The output voltage of polarity reversing division network 56 is:

$$e_{56} = e_{55}/E_R P_3 \quad (22)$$

where:
$e_{56}$ = output voltage of network 56 and
$P_3$ = setting of slider 54, as determined during standardization.

By substituting Equations / (19), (20) and (21) into Equation (22)

$$e_{56} = I_o Z_{33} + K_1 I_o Z_{33}(1 - e^{-a \mu \rho w}) - P_1 K_2 I_o Z_{32}/K_2 I_o Z_{32} P_3 \quad (23)$$

During standardization with the first sample having a thickness $w_1$ substitute for the sheet being measured and slider 53 adjusted to yield a zero voltage from network 56. $e_{56} = 0 = [I_0 Z_{33} + K_1 I_0 Z_{33}(1 - e^{-a\mu\rho w_1})] -$ $$P_1 = Z_{33}[1 + K_1(1 - e^{a\mu\rho w_1})]/K_2 Z_{32} \quad (24)$$

By solving Equation (24)

$$P_1 = Z_{33}[1 + K_1(1 - e^{-a\mu\rho w_1})]/K_2 Z_{32} \quad (25)$$

During standardization with the second sample having a coating thickness of zero substituted for the sheet being measured, and slider 54 adjusted to yield predetermined output voltage, $E_o$, of divider 56, substitution into Equation (23) yields:

$$E_o = [I_0 Z_{33} - P_1 K_2 I_0 Z_{32}/K_{22} I_0 Z_{32} P_3] \quad (26)$$

The setting of slider 54 is therefore:

$$P_3 = [I_0 Z_{33} - P_1 K_2 I_0 Z_{32}/K_2 I_0 Z_{32} E_o] \quad (27)$$

Substituting Equation (25) into Equation (27) and simplifying yields:

$$P_3 = Z_{33} K_1/Z_{32} K_2 E_o (e^{-a\mu\rho w_1} - 1) \quad (28)$$

Substituting Equations (25) and (28) into Equation (23) and simplifying yields:

$$e_{56} = E_o(e^{-a\mu\rho w} - e^{-a\mu\rho w_1})/(1 - e^{-a\mu\rho w_1}) \quad (29)$$

To eliminate the second term, $$-E_o e^{-a\mu\rho w_1}/1 - e^{-a\mu\rho w_1}$$

from Equation (29) the constant, a priori, $E_{off_3}$, determined voltage derived from slider 62 of potentiometer 61 is set equal to $$E_o e^{-a\mu\rho w_1}/1 - e^{-a\mu\rho w_1}$$

and combined with the output of divider 56 in linear combining network 64. Thereby, during normal operation while the thickness of coating 16 is being measured the output voltage of network 64, $e_{64}$, is:

$$e_{64} = E_o/1 - e^{-a\mu\rho w_1} e^{-a\mu\rho w} \quad (30)$$

From Equation 30, it is seen that the response of chamber 23 has been transformed into an exponentially decreasing function including no terms subject to drift. Drift in the components and beam intensity is compensated by the periodic standardization and division operation of network 56.

While there has been described and illustrated several specific embodiments of the invention, it will be clear that variations in the details of the embodiments specifically illustrated and described may be made without departing from the true spirit and scope of the invention as defined in the appended claims. For example, the principles of the processing circuitry can also be employed with a gamma ray source, as well as an x-ray source. If a gamma ray source is employed, no reference chamber and associated electronics are provided. Instead, the output of electrometer circuit 33 is applied directly to a circuit including appropriate offset, and control for slope direction and magnitude. With the processing circuitry associated with an X-ray source, the increased intensity of an X-ray beam source provides greater accuracy. A further modification involves the substitution of an appropriately programmed, general purpose digital computer for the electronic processing analog circuitry responsive to electrometer circuits 32 and 33.

We claim:

1. Apparatus for measuring the thickness of a metal coating on a metal substrate comprising a source of radiation irradiating the coating and substrate, said source of radiation causing the coating and substrate to fluoresce and emit energy at different energy levels, a detector responsive to the energy from the coating and substrate for deriving an output signal having a first finite, nonzero value for a coating thickness of zero and varying as a substantially increasing exponential function to a second value for a predetermined coating thickness, said output signal decreasing in value for coating thicknesses greater than the predetermined thickness, means responsive to the output signal for converting the output signal into substantially an exponentially decreasing indication in a range from zero to the predetermined thickness, said converting means including: means offsetting the output signal by an amount so that the indication has a first fixed value for a finite coating thickness within the range, and means for multiplying the output signal to control the slope magnitude of the exponential indication so that the output indication has a second fixed value for a zero thickness coating layer.

2. The apparatus of claim 1 further including means responsive to the radiation source for deriving another signal indicative of the level of radiation impinging on the coating and substrate, means combining the output and another signals for deriving the indication independently of variations in the intensity of radiation from the source.

3. The apparatus of claim 2 wherein the combining means includes means for dividing a signal including a component responsive to the output signal by a replica of the another signal.

4. The apparatus of claim 1 further including means responsive to radiation from the source which impinges on the coating for deriving another signal indicative of the level of radiation impinging on the coating and substrate, means combining the output and another signals for deriving the indication independently of variations in the intensity of radiation from the source.

5. A method of measuring the thickness of a metal coating on a metal substrate comprising irradiating the coating and substrate to cause the coating and substrate to fluoresce and emit energy at different energy levels, detecting the emitted energy from the coating and substrate to derive an output signal that varies substantially according to one function from a first finite, nonzero value for a coating thickness of zero to a second valve for a predetermined coating thickness and varies according to a different function from the second value for thicknesses greater than the predetermined thickness, converting the output signal into an indication which varies substantially as the inversion of said output signal in a range from zero to the predetermined thickness, said converting step including: offsetting the output signal by an amount so that the indication has a first fixed value for a finite coating, and multiplying the output signal to control the slope magnitude of the exponential function so that the output indication has a second fixed value for a zero thickness coating layer.

6. A method of measuring the thickness of a metal coating on a metal substrate comprising irradiating the coating and substrate to cause the coating and substrate to fluoresce and emit energy at different energy levels, detecting the emitted energy from the coating and substrate to derive an output signal having a first finite, nonzero value for a coating thickness of zero and varying as a substantially increasing exponential function to a second value for a predetermined coating thickness, said output signal decreasing in value by other than an exponential relationship for coating thicknesses greater than the predetermined thickness, converting the output signal into substantially an exponentially decreasing indication in a range from zero to the predetermined thickness, said converting step including: offsetting the output signal by an amount so that the indication has a first value for a finite coating thickness within the range, and multiplying the output signal to control the slope magnitude of the exponential function so that the output indication has a second fixed value for a zero thickness coating layer.

7. A method of measuring the thickness of a metal coating on a metal substrate comprising irradiating the coating and substrate to cause the coating and substrate to fluoresce and emit energy at different energy levels, detecting the emitted energy from the coating and substrate to derive an output signal having a first finite, nonzero value for a coating thickness of zero and varying substantially as an exponential function to a second value for a predetermined coating thickness, said output signal varying in value by other than an exponential relationship for coating thicknesses greater than the predetermined thickness, converting the output signal into an indication which varies substantially as the inversion of said output signal in a range from zero to the predetermined thickness, said converting step including: offsetting the output signal by an amount so that the indication has a first fixed value for a finite coating, and multiplying the output signal to control the slope magnitude of the exponential function so that the output indication has a second fixed value for a 8. A method of measuring the thickness of a coating on a metal substrate comprising the steps of irradiating the coating and substrate with an energy beam that causes the coating and substrate to fluoresce and emit energy at different energy levels, detecting energy emitted from the coating and substrate to derive a signal that varies substantially as an exponential function from a first finite, nonzero value for a zero coating thickness to a second value for a predetermined coating thickness, said signal varying in value by other than an exponential function for coating thicknesses greater than the predetermined thickness, processing said signal in a processing means comprising means for offsetting said signal and means for multiplying said signal to control the slope magnitude thereof, said processing means deriving an output indicative of coating thickness, substituting a first standard sample for the substrate and coating being irradiated, said first sample being a metal substrate and a coating having a known thickness less than the predetermined thickness, with the first standard sample being irradiated by the energy beam adjusting said offsetting means of the processing means so that the output has a zero value, thereafter, while the gauge response is substantially the same as while the first sample was irradiated, substituting a second standard sample consisting of the metal substrate for the substrate and coating being irradiated with the second standard sample being irradiated by the energy beam adjusting said multiplying means of the processing means so that the output has a first finite predetermined value.

9. Apparatus for measuring the thickness of a metal coating on a metal substrate comprising a source of radiation irradiating the coating and substrate, said source of radiation causing the coating and substrate to fluoresce and emit energy at different energy levels, a detector responsive to the energy from the coating and substrate for deriving an output signal having a first finite, nonzero value for a coating thickness of zero and varying as a substantially exponential function to a second value for a predetermined coating thickness, said output signal varying as a different function for coating thicknesses greater than the predetermined thickness, means responsive to the output signal for converting the output signal into an indication which varies substantially as the inversion of said output signal in a range from zero to the predetermined thickness, said converting means including: means offsetting the output signal by an amount so that the indication has a first fixed value for a finite coating thickness within the range, and means for multiplying the output signal to control the slope magnitude of the exponential indication so that the output indication has a second fixed value different from said first fixed value for a zero thickness coating layer.

10. The apparatus of claim 9 further including means responsive to the radiation source for deriving another signal indicative of the level of radiation impinging on the coating and substrate, means combining the output and another signals for deriving the indication independently of variations in the intensity of radiation from the source.

11. The apparatus of claim 10 wherein the combining means includes means for dividing a signal including a component responsive to the output signal by a replica of the another signal.

12. The apparatus of claim 9 further including means responsive to radiation from the source which impinges on the coating for deriving another signal indicative of the level of radiation impinging on the coating and substrate, means combining the output and another signals for deriving the indication independently of variations in the intensity of radiation from the source.

13. A method of measuring the thickness of a coating on a metal substrate comprising the steps of irradiating the coating and substrate with an energy beam that causes the coating and substrate to fluoresce and emit energy at different energy levels, detecting energy emitted from the coating and substrate to derive a signal that varies substantially according to one function from a first finite, nonzero value for a zero coating thickness to a second value for a predetermined coating thickness and varies according to a different function from the second value for thicknesses greater than the predetermined thickness, processing said signal in a processing means comprising means for offsetting said signal and means for multiplying said signal to control the slope magnitude thereof, said processing means deriving an output indicative of coating thickness, substituting a first sample being a metal substrate and a coating having a known thickness less than the predetermined thickness, with the first standard sample being irradiated by the energy beam adjusting said offsetting means of the processing means so that the output has a zero value, thereafter, while the gauge response is substantially the same as while the first sample was irradiated, substituting a second standard sample consisting of the metal substrate for the substrate and coating being irradiated, with the second standard sample being irradiated by the energy beam adjusting said multiplying means of the processing means so that the output has a first finite predetermined value.

14. A method of measuring the thickness of a coating on a metal substrate comprising the steps of irradiating the coating and substrate to fluoresce and emit enerty at different energy levels, detecting energy emitted from the coating and substrate to derive a signal that increases substantially exponentially from a first finite, nonzero value for a zero coating thickness to a second value for a predetermined coating thickness and decreases in value by other than an exponential relationship from the second value for thicknesses greater than the predetermined thickness, processing said signal in a processing means comprising means for offsetting said signal and means for multiplying said signal to control the slope magnitude thereof, said processing means deriving an output indicative of coating thickness, substituting a first standard sample for the substrate and coating being irradiated, said first sample being a metal substrate and a coating having a known thickness less than the predetermined thickness, with the first standard sample being irradiated by the energy beam adjusting said offsetting means of the processing means so that the output has a zero value, thereafter, while the gauge response is substantially the same as while the first sample was irradiated, substituting a second standard sample consisting of the metal substrate for the substrate and coating being irradiated, with the second standard sample being irradiated by the energy beam adjusting said multiplying means of the processing means so that the output has a first finite predetermined value.

15. The method of claim 14 further including additionally offsetting the output by a predetermined amount indicative only of fixed gauge parameters independent of gauge drift or change during operation.

16. The method of claim 15 wherein the energy is detected by first and second electrodes for deriving first and second signal responses, the processing means including means for determining the ratio of the first and second signal responses for deriving the exponentially increasing signal, further including adjusting the offset factor while the first sample is being irradiated and the further offset does not affect the output and adjusting the means for multiplying while the second standard is being irradiated and the further offset affects the output.

17. The method of claim 15 wherein the energy is detected by first and second electrodes for deriving first and second signal responses, the processing means including means for multiplying the first signal response by the offset factor, means for substractively combining the second signal response with the multiplied first signal response to derive an additional signal, and the means for multiplying is responsive to the first signal response, and means fpr determining the ratio of the additional signal and an output of the multiplying means, further including adjusting the offset factor while the further offset does not affect the output and the first sample is being irradiated and adjusting the means for multiplying while the further offset does not affect the output and the second sample is being irradiated.

* * * * *